UNITED STATES PATENT OFFICE.

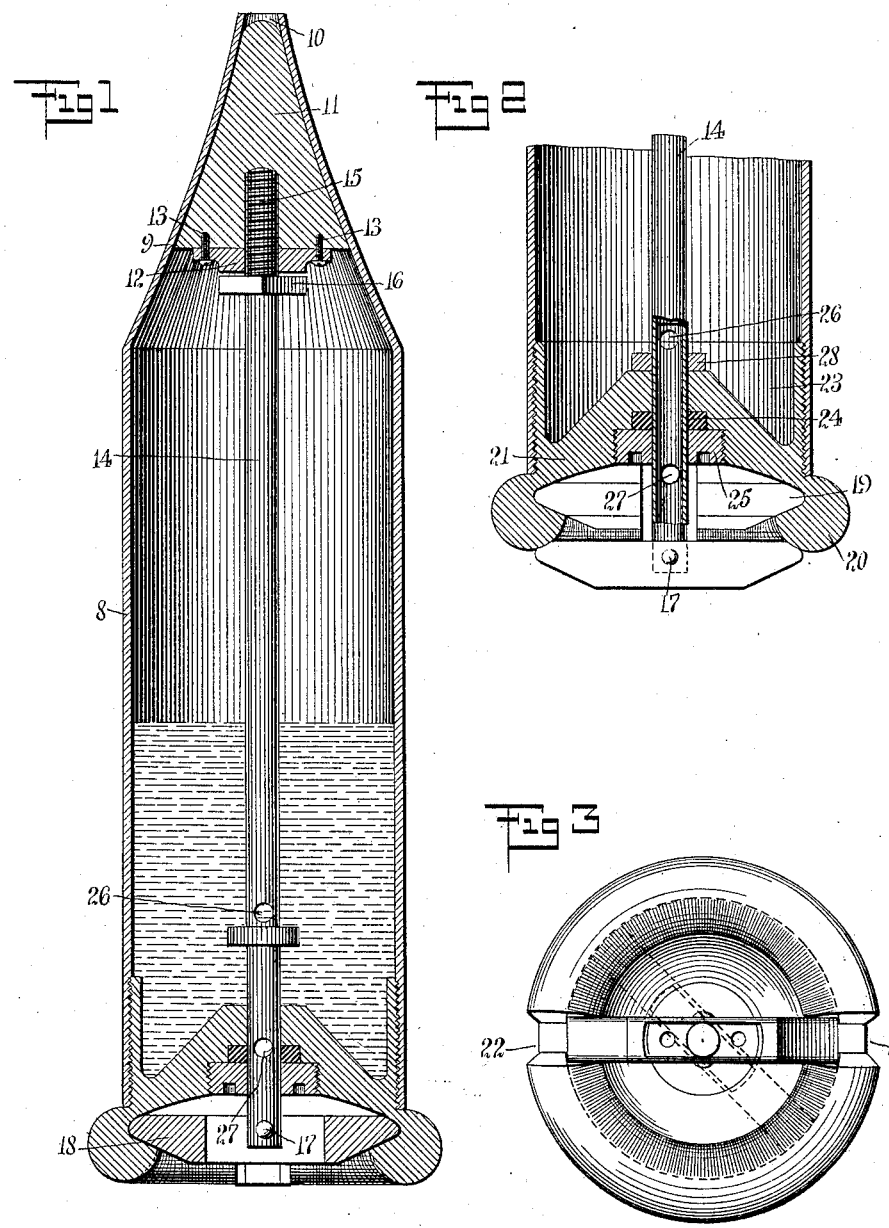

RICHARD HENRY EVANS, OF RIONDEL, BRITISH COLUMBIA, CANADA.

OILER.

1,042,899. Specification of Letters Patent. Patented Oct. 29, 1912.

Application filed May 17, 1912. Serial No. 698,007.

*To all whom it may concern:*

Be it known that I, RICHARD H. EVANS, a citizen of the United States, blacksmith, and a resident of Riondel, in the Province of British Columbia, Dominion of Canada, have invented a new and Improved Oiler, of which the following is a full, clear, and exact description.

Among the principal objects which the present invention has in view are: to provide an apparatus of the character mentioned, wherein provision is made for the exclusion of extraneous matter, such as grit, dust, water, or similar substances; to provide means for insuring the supply of oil when desired; to avoid leakage of oil from the apparatus; to insure the steady delivery of oil during the employment of the oiler; and to provide means for locking the device in sealed position, to prevent the delivery of oil therefrom.

Reference is to be had to the accompanying drawings forming a part of this specification, in which similar characters of reference indicate corresponding parts in all the views, and in which—

Figure 1 is a longitudinal section, taken on the median line, of an oiler constructed and arranged in accordance with the present invention, showing the parts of the same in position assumed while in out-of-service condition of the oiler; Fig. 2 is a longitudinal section of a fragment of the oiler, showing the parts arranged as in the service condition of the oiler; and Fig. 3 is an end view of an oiler constructed and arranged in accordance with the present invention, the parts being shown in full lines in the transition stage passing from one to the other, the out-of-service and in-service conditions above referred to, the dotted lines in this figure being used to show the normal disposition of the stopper locking bar.

As seen in the accompanying drawings, the body portion 8 is tubular, the end being contracted to form a nozzle 9. The orifice 10 of the nozzle 9 is formed to a size convenient for the operation of the oiler. The orifice is closed by a stopper 11 shaped to conform to the interior of the nozzle 9. The body of the stopper 11 is so shaped that the nose of said stopper is not protruded beyond the orifice 10, the stopper 11 working under all conditions within the nozzle 9 or body 8 of the oiler. The stopper 11 may be coated with any suitable material adapting itself to use as packing, but I prefer a stopper having a wooden core, and under ordinary conditions the surface of the core is provided to so closely fit the nozzle 9 as to render the packing referred to unnecessary. Where a packing or added surface for the stopper is employed, the body of the stopper is constructed from wood, this material lending itself most readily to the mounting of the threaded plate 12, which mounting is accomplished by screws 13, which are passed through said plate and driven into the body of the stopper 11.

The stopper 11 is manipulated by means of a rod 14. The rod 14 is furnished with a screw-threaded end 15, the threads of which register with the threads of a perforation centrally disposed and provided in the plate 12. It is to lock the rod 14 in the plate 12 that I provide a lock-nut 16, which, when jammed upon the plate 12, forms an effective lock to prevent the recession of the rod 14. The end of the rod 14 opposite the threaded end 15 is pivotally secured by a pin 17 between the sides of a cut-out section of a locking bar 18. The ends of the bar 18 are shaped as shown in the drawings, to extend within grooves 19, which are formed in the rounded rim 20 of the head 21. Access to the grooves 19 is gained through recess 22, which are formed by cutting away the rim 20, to pass the ends of the bar 18. When the ends of the bar 18 are held within the grooves 19, as seen in Fig. 1 of drawings, the stopper 11 is held firmly in closure position within the nozzle 9. When the bar 18 is lifted out of the grooves 19 and turned to rest upon the outer surface of the rim 20, as shown in Fig. 2, the stopper 11 is withdrawn from contact with the sides of the nozzle 9, to permit oil to flow through the orifice 10 thereof.

The head 21 is provided with a bell flange 23, which flange is provided with a screw-thread, to register with threads formed in the end of the body 8. To prevent the oil from passing between the walls of the perforation formed in the head 21 and the rod 14, a rubber packing 24 is employed. As shown in the drawings, this packing consists of a rubber ring mounted in a recess provided therefor in the head 21. The packing 24 is held firmly in position, and is expanded by pressure applied upon the face thereof, by means of a spanner nut 25.

The rod 14 may be constructed from tubing, it being desired that a hollow passage shall be formed in the rod, between the orifices 26 and 27. The said orifices form the terminals of a passage formed in the rod 14 for the admission of air to the chamber of the body 8. In the outer service condition, or when the stopper 11 is is position to close the orifice 10 of the nozzle 9, the orifice 27 is housed within the body of the nut 25, to prevent the passage of air into the body 8. It will be understood that the perforation in the nut 25 fits the rod 14 sufficiently close to prevent the passage of oil from the said orifice out of the apparatus. If a tube be used to form the rod 14, a plug is driven into said tube between the orifice 26 and the end 15. If solid material is used to form the rod 14, the end of the rod opposite the end 15 is bored longitudinally to form the passage between the orifices 26 and 27, and subsequently the end of said bore is closed by a plug. Any suitable method of forming the orifices 26 and 27 and the connecting tubular channel, is adapted to the needs of the present invention.

To limit the outward extension of the rod 14, and the lift of the stopper 11 from the orifice 10, I have provided a collar 28, rigidly mounted on said rod between the orifices 26 and 27.

Having thus described my invention, I claim as new and desire to secure by Letters Patent:—

1. In an oiler such as described, the combination of a tubular body portion having an end contracted to form a nozzle provided with a delivery orifice; a stopper for said nozzle, shaped to conform to the interior of said nozzle; an operating rod for said stopper, said rod extending through said body portion and beyond the end thereof; a closure head for the end of said body portion opposite that forming the nozzle; means for admitting air through said head to said body, said means being operable by said rod; a locking bar for said rod, to reciprocate the same; and an undercut rim formed on said body to engage said bar, to hold said stopper in position to close or open said nozzle.

2. In an oiler such as described, the combination of a tubular body portion having an end contracted to form a nozzle provided with a delivery orifice; a stopper for said nozzle, shaped to conform to the interior of said nozzle; an operating rod for said stopper, said rod extending through said body portion and beyond the end thereof; a closure head for the end of said body portion opposite that forming the nozzle; means for admitting air through said head to said body, said means being operable by said rod; a locking bar for said rod; an undercut rim formed on said body to engage said bar to hold said stopper in position to close or open said nozzle; and a stop collar mounted on said rod to limit the movement thereof.

3. In an oiler such as described, the combination of a tubular body portion having a nozzle-shaped end provided with a delivery orifice; a stopper shaped to conform with the inner shape of said nozzle; a closure cap for the end of said body portion opposite said nozzle; a connecting rod rigidly secured to said stopper extended through guide perforations in said cap, said rod being provided with a channel having an opening within said body portion and an opening adapted for extension beyond said cap; an expansion packing disposed in said cap to surround said rod, to close the passage between said cap and said rod; and a double-extension undercut rim for said cap adapted to receive thereunder said handle when said stopper is in closed position in said nozzle, one end of said channel formed in said rod being, in this position, within and closed by said cap.

In testimony whereof I have signed my name to this specification in the presence of two subscribing witnesses.

RICHARD HENRY EVANS.

Witnesses:
 HENRY SKONING,
 PETER LORENTZER.

---

Copies of this patent may be obtained for five cents each, by addressing the "Commissioner of Patents, Washington, D. C."